US010218745B2

(12) United States Patent
Na et al.

(10) Patent No.: US 10,218,745 B2
(45) Date of Patent: *Feb. 26, 2019

(54) SMART HOME SYSTEM USING PORTABLE DEVICE

(71) Applicant: Samsung Electronics Co., Ltd., Suwon-si (KR)

(72) Inventors: Il Kang Na, Seoul (KR); Gye Young Lee, Seoul (KR); Kwan Woo Song, Yongin-si (KR); Dong Yun Hawng, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,305

(22) Filed: Apr. 6, 2018

(65) Prior Publication Data

US 2018/0227331 A1 Aug. 9, 2018

Related U.S. Application Data

(63) Continuation of application No. 14/157,018, filed on Jan. 16, 2014, now Pat. No. 9,948,685.

(30) Foreign Application Priority Data

Jan. 18, 2013 (KR) .................. 10-2013-0005899

(51) Int. Cl.
G06F 15/16 (2006.01)
H04L 29/06 (2006.01)
(Continued)

(52) U.S. Cl.
CPC ..... *H04L 65/1033* (2013.01); *G06Q 30/0283* (2013.01); *G08C 17/02* (2013.01);
(Continued)

(58) Field of Classification Search
CPC ............ H04L 65/1033; H04L 12/2836; H04L 12/2818; H04L 2012/2841; G08C 17/02; G08C 2201/93; G06Q 30/0283
See application file for complete search history.

(56) References Cited

U.S. PATENT DOCUMENTS 6,560,217 B1 * 5/2003 Peirce, Jr. ............... H04L 45/58
370/351
6,975,655 B2 * 12/2005 Fischer ................. H04L 1/0003
370/395.62
(Continued)

FOREIGN PATENT DOCUMENTS

CN 2583728 Y 10/2003
CN 201278536 Y 7/2009
(Continued)

OTHER PUBLICATIONS

International Search Report dated Apr. 24, 2014 in International Patent Application No. PCT/KR2014/000462.
(Continued)

*Primary Examiner* — Richard G Keehn
(74) *Attorney, Agent, or Firm* — Staas & Halsey LLP

(57) ABSTRACT

A smart home system using a portable device in which a gateway function is installed in the portable device to provide a smart home service using a multiplex gateway, and a control method thereof is provided. The smart home system includes one or more portable devices and one or more home appliances located in a home, each of the one or more portable devices and one or more home appliances having a gateway, a home network to interconnect the one or more portable devices and the one or more home appliances, and a master device selected from among the one or more portable devices or the one or more home appliances, the master device activating the gateway thereof to connect the home network with an external communication network, (Continued)

wherein the master device transfers a home appliance control command to a corresponding one of the one or more home appliances.

18 Claims, 15 Drawing Sheets

(51) Int. Cl.
*H04L 12/28* (2006.01)
*G06Q 30/02* (2012.01)
*G08C 17/02* (2006.01)

(52) U.S. Cl.
CPC ...... *H04L 12/2818* (2013.01); *H04L 12/2836* (2013.01); *G08C 2201/93* (2013.01); *H04L 2012/2841* (2013.01)

(56) References Cited

U.S. PATENT DOCUMENTS

| | | | | |
|---|---|---|---|---|
| 6,999,433 | B2* | 2/2006 | Baum | H04L 12/6418 370/328 |
| 7,227,872 | B1* | 6/2007 | Biswas | H04L 29/12367 370/465 |
| 7,237,029 | B2 | 6/2007 | Hino et al. | |
| 2002/0069276 | A1* | 6/2002 | Hino | H04L 12/2803 709/223 |
| 2003/0018753 | A1* | 1/2003 | Seki | H04L 12/2803 709/219 |
| 2005/0120246 | A1 | 6/2005 | Jang et al. | |
| 2006/0155802 | A1* | 7/2006 | He | H04L 29/06 709/203 |
| 2007/0133569 | A1 | 6/2007 | Lee et al. | |
| 2008/0209034 | A1* | 8/2008 | Shin | H04L 12/2825 709/224 |
| 2009/0060028 | A1* | 3/2009 | Liu | H04N 21/43615 375/240.01 |
| 2009/0072991 | A1 | 3/2009 | Hayashi et al. | |
| 2009/0077239 | A1* | 3/2009 | Kaneko | H04L 41/06 709/227 |
| 2009/0243869 | A1 | 10/2009 | Sanderford, Jr. | |
| 2010/0008306 | A1* | 1/2010 | Pan | H04W 76/10 370/329 |
| 2010/0180037 | A1* | 7/2010 | Dessart | H04L 63/0272 709/227 |
| 2010/0217837 | A1* | 8/2010 | Ansari | G06Q 30/04 709/218 |
| 2011/0106279 | A1 | 5/2011 | Cho et al. | |
| 2011/0128378 | A1 | 6/2011 | Raji | |
| 2011/0138208 | A1* | 6/2011 | Lee | H04L 12/10 713/323 |
| 2012/0176247 | A1* | 7/2012 | Feldstein | H04N 21/4131 340/654 |
| 2012/0246255 | A1* | 9/2012 | Walker | H04W 60/005 709/208 |
| 2013/0132501 | A1* | 5/2013 | Vandwalle | H04L 67/104 709/208 |
| 2013/0185373 | A1* | 7/2013 | Vandwalle | H04W 56/0015 709/208 |
| 2014/0150073 | A1* | 5/2014 | Bone | H04L 63/0853 726/5 |

FOREIGN PATENT DOCUMENTS

| | | |
|---|---|---|
| CN | 102064985 A | 5/2011 |
| CN | 102118284 A | 7/2011 |
| CN | 102183932 A | 9/2011 |
| CN | 102281251 A | 12/2011 |
| CN | 102411836 A | 4/2012 |
| KR | 10-2007-0098171 | 10/2007 |
| KR | 10-2008-0072165 | 8/2008 |

OTHER PUBLICATIONS

Extended European Search Report dated May 18, 2016 in European Patent Application No. 14151455.4.
Australian Office Action dated May 4, 2016 in Australian Patent Application No. 2014207970.
Jiali Bian, et al., "The New Intelligent Home Control System Based on the Dynamic and Intelligent Gateway", Proceedings of IEEE IC-BNMT2011, 2011, pp. 526-530.
Ji Eun Kim, et al., "Seamless Integration of Heterogeneous Devices and Access Control in Smart Homes", 8th IEEE International Conference on Intelligent Environments, Jun. 2012, pp. 206-213.
Hyuncheol Kim et al., "Functional Architecture of Mobile Gateway and Home Server for Virtual Home Services" ICIC 2005, pp. 781-790.
Australian Office Action dated Aug. 23, 2016 in Australian Patent Application No. 2014207970.
Telegesis, "Exceptional ZigBee solutions without the need for specialist skills", dated Oct. 2, 2009, <URL: http://www.telegesis.com/products/>.
Chinese Office Action dated Dec. 28, 2017, in corresponding Chinese Patent Application No. 201480009252.9.
Australian Decision on Grant dated Jan. 5, 2017 in corresponding Australian Application No. 2014207970.
Office Action dated Feb. 13, 2017 in U.S. Appl. No. 14/157,018.
Office Action dated Aug. 16, 2017 in U.S. Appl. No. 14/157,018.
Advisory Action dated Oct. 25, 2017 in U.S. Appl. No. 14/157,018.
Notice of Allowance dated Dec. 11, 2017 in U.S. Appl. No. 14/157,018.
U.S. Appl. No. 14/157,018, filed Jan. 16, 2014, Il Kang Na et al., Samsung Electronics Co., Ltd.
Israeli Office Action dated Mar. 23, 2018.
European Office Action dated Oct. 8, 2018 in corresponding European Patent Application No. 14 151 455.4.
Chinese Office Action dated Jul. 27, 2018 in corresponding Chinese Patent Application No. 201480009252.9.

* cited by examiner

SMART HOME SYSTEM USING PORTABLE DEVICE

CROSS-REFERENCE TO RELATED APPLICATIONS

This application is a continuation of U.S. patent application Ser. No. 14/157,018, filed Jan. 16, 2014, which claims the priority benefit of Korean Patent Application No. 10-2013-0005899, filed on Jan. 18, 2013 in the Korean Intellectual Property Office, the disclosure of which is incorporated herein by reference.

BACKGROUND

1. Field

Embodiments to a smart home system using a portable device in which a gateway function is installed in the portable device to provide a smart home service using a multiplex gateway.

2. Description of the Related Art

Embodiments are associated with a home network system using a portable device in which the user may, using his/her portable device from outside his/her home, monitor the states of home appliances in the home and perform control operations based on the monitoring results.

In general, a home automation system (HAS) provides a variety of convenient functions to each home.

Particularly, the HAS has recently provided a wider variety of functions based on the Internet in cooperation with the development of data communication technologies, and a home network function may also be considered to be one of such functions.

The home network function refers to a function in which, when the user is away from home, he/she may access an Internet network using a computer terminal to monitor the states of various home appliances in the home and perform simple control operations based on the monitoring results.

FIG. 1 is a conceptual diagram of a conventional smart home system which provides such a home network function. In the conventional smart home system, the user may perform state-monitoring and control of home appliances 500-1 to 500-4 in a home through an external communication network 200 and a fixed gateway 400 in the home connected to the external communication network 200 using a portable device 100. The external communication network 200 may be coupled to an external server 300 located outside of a home.

That is, in the conventional smart home system, it may be possible to perform state-monitoring and control of the home appliances in the home through the fixed gateway 400, located in the home.

The use of the fixed gateway 400 necessitates the use of gate equipment. However, a consumer has difficulty in readily purchasing new equipment in that the smart home system is still at an early market stage.

Further, in a structure employing one such gateway 400, all functions are performed via the gateway 400, resulting in a bottleneck at the gateway 400. For this reason, the gateway 400 is required to have high performance.

In addition, when the gateway 400 malfunctions, a large amount of time may be required to fix the gateway 400, and services may not be provided to a customer during such time, resulting in great inconvenience to the customer.

SUMMARY

In an aspect of one or more embodiments, there is provided a smart home system using a multiplex gateway in which a gateway function is installed in a portable device so that the user may more readily use a smart home service.

In an aspect of one or more embodiments, there is provided a smart home system which includes one or more portable devices and one or more home appliances located in a home, each of the one or more portable devices and one or more home appliances having a gateway, a home network to interconnect the one or more portable devices and the one or more home appliances, and a master device selected from among the one or more portable devices or the one or more home appliances, the master device activating the gateway thereof to connect the home network with an external communication network, wherein the master device receives a home appliance control command input from a user and transfers the received home appliance control command to a corresponding one of the one or more home appliances.

One of the one or more portable devices may be selected as the master device when the one or more portable devices are connected to the home network.

One of the one or more home appliances may be selected as the master device when only the one or more home appliances are connected to the home network.

The master device may be selected from among the one or more portable devices or the one or more home appliances based on Internet protocol (IP) address information of the one or more portable devices or one or more home appliances.

The master device may periodically transfer a check alive message to the one or more portable devices and one or more home appliances connected to the home network.

One of the one or more portable devices or one or more home appliances connected to the home network may be selected as a new master device when each of the one or more portable devices and one or more home appliances connected to the home network fails to receive the check alive message for a certain period of time.

The master device may transfer a synchronization message for data synchronization with the one or more home appliances connected to the home network or a history information request signal to the one or more home appliances.

Each of the one or more home appliances connected to the home network may generate and store history information upon receiving the synchronization message, and transfer the history information to the master device.

Each of the one or more home appliances connected to the home network may determine whether a history index in the history information request signal is up-to-date information, upon receiving the history information request signal.

Each of the one or more home appliances connected to the home network may transfer history information corresponding to the history index to the master device when the history index is determined to be up-to-date information.

Each of the one or more home appliances connected to the home network may generate and store latest history information when the history index is determined not to be up-to-date information, and transfer the latest history information to the master device.

In an aspect of one or more embodiments, there is provided a portable device which includes a communication unit connected to a home network, the communication unit transmitting/receiving data to/from one or more other portable devices or one or more home appliances connected to the home network, a gateway to connect the home network with an external communication network, and a controller to determine whether to activate the gateway, based on device information of the portable device and the one or more other portable devices connected to the home network, wherein the controller receives a home appliance control command input from a user when the gateway is activated, and transfers the received home appliance control command to a corresponding one of the one or more home appliances.

The device information may include IP address information.

The portable device may further include a storage unit to store IP address information of the one or more other portable devices and the one or more home appliances and history information of the one or more home appliances.

When the gateway is activated, the controller may perform a control operation to transfer a synchronization message for data synchronization with the one or more home appliances to the one or more home appliances or transfer a check alive message to the one or more other portable devices and the one or more home appliances.

When a history information request signal from the user is received, the controller may perform a control operation to include a history index in the history information request signal and transfer the resulting history information request signal to a corresponding one of the one or more home appliances.

In an aspect of one or more embodiments, there is provided a home appliance which includes a communication unit connected to a home network, the communication unit transmitting/receiving data to/from one or more other home appliances connected to the home network, a gateway to connect the home network with an external communication network, and a controller to determine whether to activate the gateway, based on device information of the home appliance and the one or more other home appliances connected to the home network, wherein the controller receives a home appliance control command input from a user when the gateway is activated, and transfers the received home appliance control command to a corresponding one of the one or more other home appliances.

The device information may include IP address information.

The home appliance may further include a storage unit to store IP address information and history information of the one or more other home appliances.

When the gateway is activated, the controller may perform a control operation to transfer a synchronization message for data synchronization with the one or more other home appliances or a check alive message to the one or more other home appliances.

When the communication unit receives a synchronization message, the controller may perform a control operation to generate and store history information and transfer the history information to a device in which the gateway is activated.

The controller may determine whether a history index in a history information request signal is up-to-date information, when the communication unit receives the history information request signal.

The controller may transfer history information corresponding to the history index to a device in which the gateway is activated, when the history index is determined to be up-to-date information.

When the history index is determined not to be up-to-date information, the controller may perform a control operation to generate and store latest history information and transfer the latest history information to a device in which the gateway is activated.

In an aspect of one or more embodiments, there is provided a control method of a smart home system, which includes one or more portable devices and one or more home appliances each having a gateway to connect a home network with an external communication network, includes searching for the one or more home appliances to construct the home network, selecting a master device from among the one or more portable devices or the one or more home appliances connected to the home network, activating the gateway of the master device, connecting the home network with the external communication network through the master device, and transferring a home appliance control command input from a user to a corresponding one of the one or more home appliances through the master device.

The selecting may include selecting one of the one or more portable devices as the master device when the one or more portable devices are connected to the home network.

The selecting may include selecting one of the one or more home appliances as the master device when only the one or more home appliances are connected to the home network.

The selecting may include selecting the master device from among the one or more portable devices or the one or more home appliances based on IP address information of the one or more portable devices or one or more home appliances.

The master device may periodically transfer a check alive message to the one or more portable devices and one or more home appliances connected to the home network.

One of the one or more portable devices or one or more home appliances connected to the home network may be selected as a new master device when each of the one or more portable devices and one or more home appliances connected to the home network fails to receive the check alive message for a certain period of time.

The master device may transfer a synchronization message for data synchronization with the one or more home appliances connected to the home network or a history information request signal to the one or more home appliances.

Each of the one or more home appliances connected to the home network may generate and store history information upon receiving the synchronization message, and transfer the history information to the master device.

Each of the one or more home appliances connected to the home network may determine whether a history index in the history information request signal is up-to-date information, upon receiving the history information request signal.

Each of the one or more home appliances connected to the home network may transfer history information corresponding to the history index to the master device when the history index is determined to be up-to-date information.

Each of the one or more home appliances connected to the home network may generate and store latest history information when the history index is determined not to be up-to-date information, and transfer the latest history information to the master device.

In an aspect of one or more embodiments, there is provided a smart home system which includes one or more first portable devices and one or more home appliances located in a home, a home network to interconnect the one or more first portable devices and the one or more home appliances, and a second portable device having a gateway, the second portable device being located in the home and connected to the home network and activating the gateway to connect the home network with an external communication network and transfer a home appliance control command input from a user to a corresponding one of the one or more home appliances.

In an aspect of one or more embodiments, there is provided a control method of a smart home system, which includes one or more first portable devices and one or more home appliances located in a home, and a second portable device having a gateway, the second portable device being located in the home and receiving a home appliance control command input from a user, includes searching for the one or more home appliances to construct a home network, selecting the second portable device as a master device based on device information of the second portable device and one or more first portable devices connected to the home network, activating the gateway of the master device, connecting the home network with an external communication network through the master device, and transferring the home appliance control command input from the user to a corresponding one of the one or more home appliances through the master device.

In an aspect of one or more embodiments, there is provided a control method of a smart home system, the smart home system comprising at least one portable device located outside a home and a plurality of home appliances located in the home, the method including searching for the home appliances to construct a home network; selecting one of the home appliances as a master device based on device information of the home appliances connected to the home network; activating the gateway of the master device; connecting the home network with an external server located outside the home through an external communication network located outside the home using the master device; connecting the at least one portable device to the master device through the external communication network; and transferring a home appliance control command input from a user through the at least one portable device to a corresponding one of the home appliances through the master device.

The device information may include Internet protocol (IP) address information.

The selected home appliance may have the lowest IP address among the home appliances.

In an aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
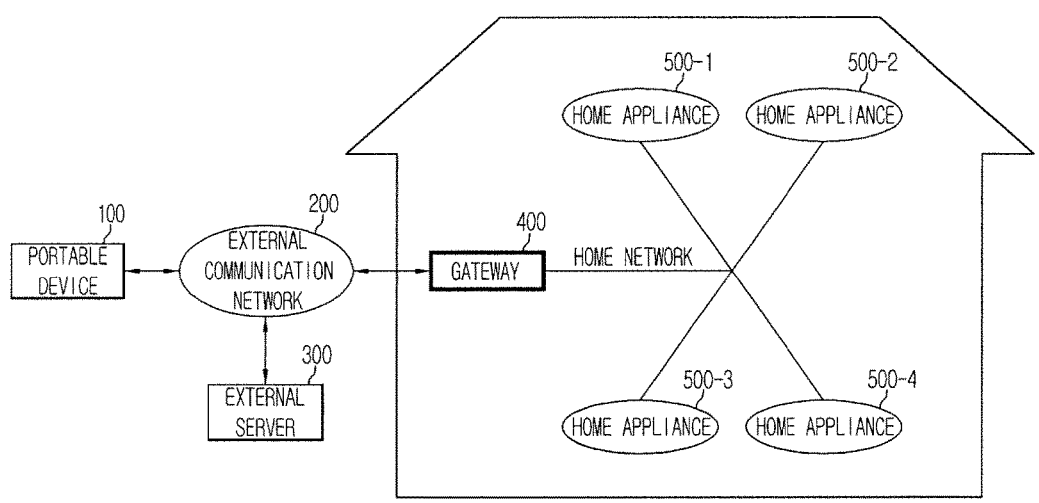
FIG. 1 is a conceptual diagram of a conventional smart home system using a fixed gateway.

Reference will now be made in detail to embodiments, examples of which are illustrated in the accompanying drawings, wherein like reference numerals refer to like elements throughout.

Figure 2:
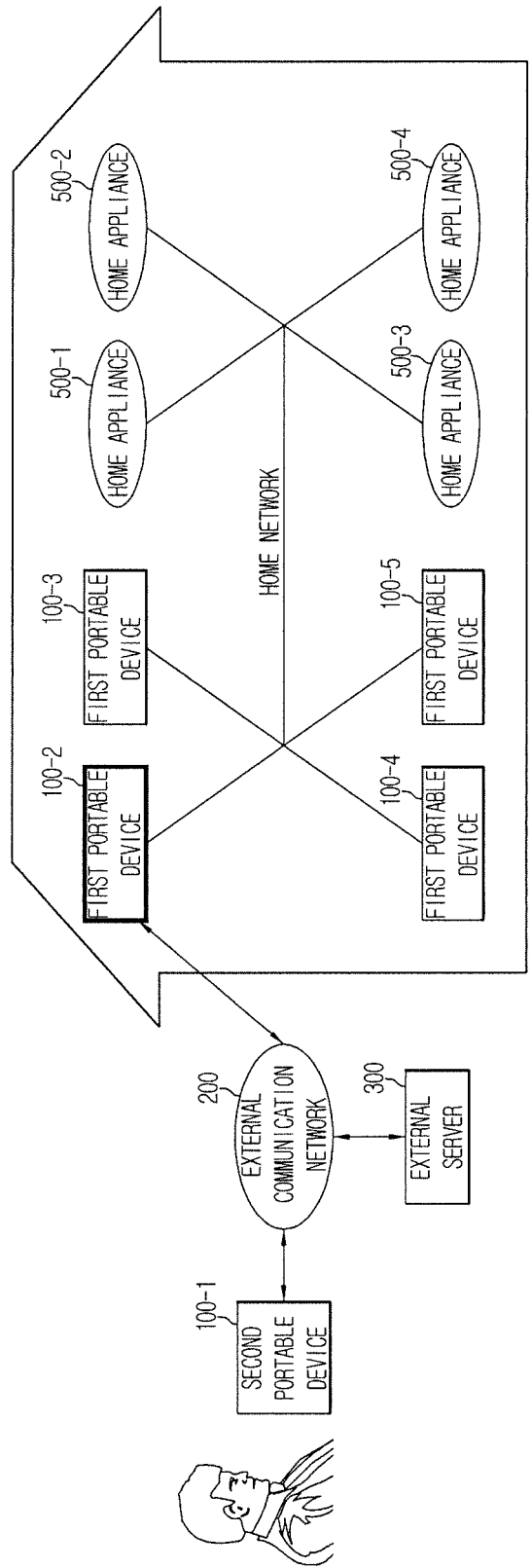
FIG. 2 is a conceptual diagram of a smart home system using a portable device equipped with a gateway in the case where the user is away from home, according to an embodiment.

FIG. 2 is a conceptual diagram of a smart home system using a portable device equipped with a gateway in the case where the user is away from home, according to an embodiment.

The smart home system refers to an individual home system that supports home automation. A variety of automation techniques (illumination/temperature control, door/window control, security system control, etc.) of an intelligent building may also be applied to the home automation, and the smart home system may enable home theater control, automatic and efficient connections to an air conditioner, a security system and a medical system, etc.

Referring to FIG. 2, the smart home system according an embodiment may include a second portable device 100-1, an external communication network 200 and an external server 300 located outside a home, and one or more first portable devices 100-2 to 100-5 and one or more home appliances 500-1 to 500-4 located in the home.

In the smart home system, the first portable devices 100-2 to 100-5 (also collectively denoted by reference numeral 100) and the home appliances 500-1 to 500-4 (also collectively denoted by reference numeral 500) may be connected to a home network.

Each first portable device 100 in the home may be an Internet-connectable device such as a mobile phone. The second portable device 100-1 may, through execution of an application, be connected to a master device of the smart home system via the external communication network 200 and, in turn, to the one or more home appliances 500 via the master device.

The second portable device 100-1 may transmit a control command for the one or more home appliances 500-1 to 500-4 input from the user to the master device such that the master device transfers the control command to the one or more home appliances 500-1 to 500-4.

Here, the master device signifies a device whose gateway is activated to connect the home network to the external communication network 200. The master device may be one first portable device or home appliance selected from among the one or more first portable devices 100-2 to 100-5 or home appliances 500-1 to 500-4 based on device information, and have a gateway activated to connect the home network to the external communication network 200. The master device may transfer a control command for the one or more home appliances 500-1 to 500-4 input from the user to the one or more home appliances 500-1 to 500-4.

The user may control the home appliances 500-1 to 500-4 in the smart home system or monitor the states of the home appliances 500-1 to 500-4, through the second portable device 100-1 outside the home and the master device.

For example, the second portable device 100-1 outside the home may have the same function as that of each of the one or more first portable devices 100-2 to 100-5 in the home or be one moved out of the home among the one or more first portable devices 100-2 to 100-5 in the home.

Each of the one or more first portable devices 100-2 to 100-5 in the home may be an Internet-connectable mobile phone equipped with a gateway.

An embodiment may be characterized in that a conventional fixed gateway is not used and each of the one or more first portable devices 100-2 to 100-5 is equipped with a gateway so as to perform a gateway function. In this regard, in an embodiment, each of the one or more first portable devices 100-2 to 100-5 may include a gateway (not shown).

As stated above, the master device may be one selected from among the one or more first portable devices 100-2 to 100-5 or home appliances 500-1 to 500-4 in the home. In the case where the one or more first portable devices 100-2 to 100-5 are connected to the home network, one thereof may be selected as the master device. Alternatively, in the case where only the one or more home appliances 500-1 to 500-4 are connected to the home network, one thereof may be selected as the master device.

Because the one or more first portable devices 100-2 to 100-5 are shown in FIG. 2 as existing in the home, the following description will be given on the assumption that the first portable device 100-2 is selected as the master device. In addition, the master device will be denoted by the same reference numeral as that of the first portable device 100-2.

When the first portable device 100-2 is selected as the master device, it may periodically transfer a check alive message to the other first portable devices 100-3 to 100-5 in the home and the data-communicable home appliances 500-1 to 500-4 in the home.

Each of the first portable devices 100-3 to 100-5 in the home, other than the master device 100-2, and the home appliances 500-1 to 500-4 in the home determines that the master device 100-2 has been activated, through the check alive message periodically received from the master device 100-2.

Upon failing to receive the check alive message from the master device 100-2 for a certain period of time, each of the other first portable devices 100-3 to 100-5 and home appliances 500-1 to 500-4 determines that the master device 100-2 has been deactivated.

For example, when the first portable device 100-2 acting as the master device is moved out of the home, when the first portable device 100-2 is powered off, or when the connection of the first portable device 100-2 to the home network is released, the master device 100-2 may be deactivated.

If the other first portable devices 100-3 to 100-5 and the home appliances 500-1 to 500-4 fail to receive the check alive message from the master device 100-2 for the certain period of time, one of the other first portable devices 100-3 to 100-5 or home appliances 500-1 to 500-4 connected to the home network may be selected as a new master device.

For example, the other first portable devices 100-3 to 100-5 connected to the home network may be searched for, respective Internet protocol (IP) address information thereof may be compared with one another, and one of the other first portable devices 100-3 to 100-5 having lowest IP address information among the respective IP address information may be selected as a new master device as a result of the comparison.

When a new portable device is additionally connected to the home network, a new master device may be selected even if the first portable device 100-2 is not deactivated. For example, in the case where the second portable device 100-1 outside the home is moved into the home and connected to the home network, the portable devices 100-1 to 100-5 connected to the home network may be searched for, respective IP address information thereof may be compared with one another, and one of the portable devices 100-1 to 100-5 having lowest IP address information among the respective IP address information may be selected as a new master device as a result of the comparison.

Moreover, the master device 100-2 may be linked with the second portable device 100-1 and the external server 300 through the external communication network 200. The master device 100-2 may connect the first portable devices 100-3 to 100-5 and home appliances 500-1 to 500-4 connected to the home network with the second portable device 100-1 and external server 300 located outside the home.

In addition, the master device 100-2 may transfer a synchronization message for data synchronization with the one or more home appliances 500-1 to 500-4 connected to the home network or a history information request signal to the one or more home appliances 500-1 to 500-4 at a predetermined time.

For example, the predetermined time may include when the second portable device 100-1 is connected to the home network, when the master device is connected to the home network for the first time, or when a change occurs in the first portable devices 100-2 to 100-5 and home appliances 500-1 to 500-4 connected to the home network.

In addition, the master device 100-2 may receive synchronized data from the one or more home appliances 500-1 to 500-4 and store the received synchronized data in a storage unit (not shown) thereof.

The external communication network 200 is connected with the second portable device 100-1 and external server 300 outside the home and the master device 100-2 in the home.

For example, the external communication network 200 may include a general mobile communication network, a third-generation (3G) network, or a wireless Internet network.

The external server 300 may transmit/receive data to/from the portable devices 100-1 to 100-5 and the home appliances 500-1 to 500-4 and provide desired information to the portable devices 100-1 to 100-5 and the home appliances 500-1 to 500-4.

For example, the external server 300 may include a server of a utility company or a server that provides electricity pricing information.

The server of the utility company may provide electricity price variation-based energy level information of each of the home appliances 500-1 to 500-4 in the home to the master device 100-2. The server of the utility company may flexibly (selectively) fix different electricity prices in connection with power consumptions of the home appliances 500-1 to 500-4 in the home and supply electricity to the home appliances 500-1 to 500-4 in the home for the fixed electricity prices.

The external server 300 is not limited thereto, and may include a different type of server.

The one or more home appliances 500-1 to 500-4 may be a variety of power-consuming devices in the home, which may include an air conditioner, a refrigerator, a washing machine, etc. The home appliances 500-1 to 500-4 may be connected to the home network and controlled by the external second portable device 100-1, and may transmit and receive data.

Upon receiving the synchronization message from the master device 100-2, each of the home appliances 500-1 to 500-4 may generate history information and various data in linkage with the external server 300 and store the generated history information and data in a storage unit (not shown) thereof. Each of the home appliances 500-1 to 500-4 may transfer various data including the history information to the master device 100-2 and, in turn, to the second portable device 100-1 outside the home through the master device 100-2.

In addition, upon receiving the history information request signal from the second portable device 100-1, each of the home appliances 500-1 to 500-4 may determine whether a history index included in the history information request signal is up-to-date information. If the history index is determined to be up-to-date information, each of the home appliances 500-1 to 500-4 may provide latest history information corresponding to the history index to the master device 100-2 and the second portable device 100-1. If the history index is determined not to be up-to-date information, each of the home appliances 500-1 to 500-4 may generate and store latest history information and provide the latest history information to the master device 100-2 and the second portable device 100-1.

Moreover, each of the home appliances 500-1 to 500-4 may include a gateway (not shown).

In the case where there is no portable device in the home, one of the home appliances 500-1 to 500-4 may be selected as the master device. The home appliance selected as the master device may perform all the above-described functions of the master device.

Exceptionally, when a first portable device is moved into the home and newly connected to the home network under the condition that one of the home appliances 500-1 to 500-4 has been selected as the master device, the first portable device newly connected to the home network may be selected as the master device.

Figure 3:
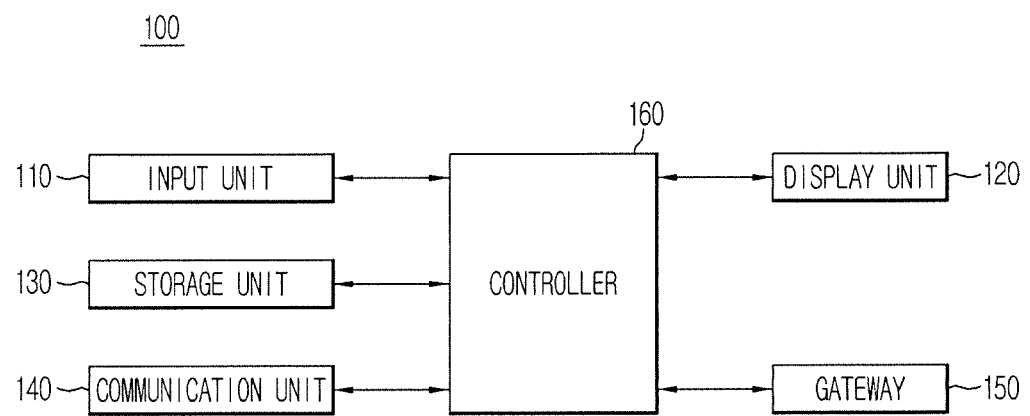
FIG. 3 is a block diagram showing the configuration of the gateway-equipped portable device according to an embodiment.

FIG. 3 is a block diagram showing the configuration of the gateway-equipped portable device according to an embodiment.

Referring to FIG. 3, each portable device 100 may include an input unit 110, a display unit 120, a storage unit 130, a communication unit 140, a gateway 150, and a controller 160.

The input unit 110 enables the user to input information.

The input unit 110 may have a plurality of numeral keys and function keys, and output key input data corresponding to a key depressed by the user to the controller 160.

The display unit 120 may display various contents and messages under control of the controller 160.

For example, the display unit 120 may be a liquid crystal display (LCD), a thin film transistor (TFT) LCD, or an organic electroluminescence (EL) display.

The input unit 110 and the display unit 120 may constitute a touch screen. In this case, the input unit 110 may include a touch panel to sense a user touch, and recognize a touch position, a movement direction, the number of touches, etc. from a touch signal sensed by the touch panel and provide the recognition results to the controller 160.

The storage unit 130 may store a plurality of programs and data necessary for the operation of the portable device 100.

For example, the storage unit 130 may include a read only memory (ROM), a random access memory (RAM), and other storage media.

The storage unit 130 may store the synchronized data received from the one or more home appliances 500-1 to 500-4. For example, the synchronized data may include history information, such as the amount of electricity used (power consumption) and a home appliance control history of a corresponding one or more of the home appliances 500-1 to 500-4.

The storage unit 130 may also store IP address information of the one or more first portable devices 100-2 to 100-5 and home appliances 500-1 to 500-4.

The communication unit 140 may transmit/receive data to/from the other portable devices or home appliances 500-1 to 500-4 connected to the home network. The communication unit 140 may also transmit/receive radio frequency (RF) signals to/from a base station through an antenna such that a corresponding one of the portable devices 100-2 to 100-5 performs wireless communication with the base station.

The gateway 150 is a device that interconnects two or more communication networks of different types or the same type such that information is exchanged between the communication networks. In this regard, the gateway 150 may interconnect the home network and the external communication network 200.

The gateway 150 may be activated when the corresponding portable device becomes the master device, and deactivated when the corresponding portable device does not function as the master device.

When the gateway 150 is activated, the first portable devices 100-2 to 100-5 and home appliances 500-1 to 500-4 connected to the home network in the home may transmit/receive information to/from the second portable device 100-1 and external server 300 outside the home through the gateway 150.

For example, the gateway 150 may act to connect the second portable device 100-1 outside the home to the home appliances 500-1 to 500-4 in the home or provide the history information of the home appliances 500-1 to 500-4 in the home to the second portable device 100-1.

The controller 160 may perform general communication functions, such as call and data transmission/reception, and control other components of the corresponding portable device.

The controller 160 may generate a control signal to connect the corresponding portable device to the home network. The controller 160 may also determine whether the gateway 150 has been activated, based on device information of the first portable devices 100-2 to 100-5 connected to the home network. For example, the device information may include IP address information. If the gateway 150 is activated, the corresponding portable device is selected as the master device.

When the gateway 150 is activated, the controller 160 may receive a control command for the one or more home appliances 500-1 to 500-4 from the user and transfer the received control command to the one or more home appliances 500-1 to 500-4.

A method of selecting one master device will be described with reference to FIG. 2. As shown in FIG. 2, the one or more portable devices 100-2 to 100-5 and the one or more home appliances 500-1 to 500-4 are present in the home.

The controller 160 may search for the portable devices 100-2 to 100-5 connected to the home network. Then, the controller 160 may transmit IP address information of a corresponding one of the portable devices 100-2 to 100-5 to the other portable devices connected to the home network and receive IP address information of the other portable devices from the other portable devices.

The controller 160 may store the IP address information of the corresponding portable device and the IP address information of the other portable devices connected to the home network in the storage unit 130. Then, the controller 160 may compare the stored IP address information with one another, and select the corresponding portable device as the master device if the IP address information of the corresponding portable device is lowest.

For example, assume that the IP address information of the first portable device 100-2 is 168.203.100.3, the IP address information of the first portable device 100-3 is 210.103.60.1, the IP address information of the first portable device 100-4 is 211.106.60.1, and the IP address information of the first portable device 100-5 is 266.107.60.4. Because the IP address information of the first portable device 100-2 is lowest, the controller 160 of the first portable device 100-2 may select the first portable device 100-2 as the master device.

Selecting the master device is not limited to the above method, and may be performed by any other method.

When the first portable device 100-2 is selected as the master device, namely, the gateway 150 thereof is activated, the controller 160 of the master device 100-2 may perform a control operation to transfer the synchronization message for the data synchronization with the one or more home appliances 500-1 to 500-4 to the one or more home appliances 500-1 to 500-4 or transfer the check alive message to the one or more other portable devices 100-3 to 100-5 and the one or more home appliances 500-1 to 500-4.

Upon periodically receiving the check alive message from the master device 100-2, each of the portable devices 100-3 to 100-5 in the home, other than the master device 100-2, and the home appliances 500-1 to 500-4 in the home determines that the master device 100-2 has been activated.

Upon failing to receive the check alive message from the master device 100-2, each of the other portable devices 100-3 to 100-5 and home appliances 500-1 to 500-4 determines that the master device 100-2 has been deactivated.

For example, when the first portable device 100-2 acting as the master device is moved out of the home, when the first portable device 100-2 is powered off, or when the connection of the first portable device 100-2 to the home network is released, the master device 100-2 may be deactivated.

If it is determined that the master device 100-2 has been deactivated, a new master device may be selected from among the other portable devices 100-3 to 100-5.

That is, the other portable devices 100-3 to 100-5 connected to the home network may be searched for, respective IP address information thereof may be compared with one another, and one of the other portable devices 100-3 to 100-5 having lowest IP address information among the respective IP address information may be selected as a new master device as a result of the comparison.

When a new portable device is additionally connected to the home network, a new master device may be selected even if the first portable device 100-2 is not deactivated.

For example, in the case where the second portable device 100-1 outside the home is moved into the home and connected to the home network, the portable devices 100-1 to 100-5 connected to the home network may be searched for, respective IP address information thereof may be compared with one another, and one of the portable devices 100-1 to 100-5 having lowest IP address information among the respective IP address information may be selected as a new master device as a result of the comparison.

When the first portable device 100-2 is selected as the master device, the controller 160 of the master device 100-2 may activate the gateway 150 of the master device 100-2. However, when the first portable device 100-2 does not function as the master device, the controller 160 of the first portable device 100-2 may deactivate the gateway 150 of the first portable device 100-2.

Moreover, when the first portable device 100-2 is selected as the master device, the controller 160 of the master device 100-2 may link the master device 100-2 with the external server 300 through the external communication network 200 using the gateway 150.

In addition, upon receiving a connection request from the external second portable device 100-1, the controller 160 of the master device 100-2 may perform an authentication process based on user authentication information of the second portable device 100-1.

When user authentication is completed, the controller 160 of the master device 100-2 may connect the second portable device 100-1 to the home network.

Furthermore, the controller 160 of the master device 100-2 may synchronize history information of each of the home appliances 500-1 to 500-4 with a latest version through a data synchronization process.

In detail, in an embodiment, the master device may be changed because portable devices may be moved into and out of the home. In the case where the master device is changed in the home network, data synchronization is required.

Therefore, when the master device is connected to the home network or when a change occurs in the first portable devices 100-2 to 100-5 and home appliances 500-1 to 500-4 connected to the home network, the controller 160 of the master device may transfer the synchronization message to the home appliances 500-1 to 500-4.

For example, the controller 160 of the master device 100-2 may synchronize the history information of each of the home appliances 500-1 to 500-4 with the latest version when a new portable device is connected to the home network, when the connection of an existing portable device to the home network is released, or at an interval of a predetermined period.

In addition, upon receiving a history information request signal for the one or more home appliances 500-1 to 500-4 from the user, the controller 160 of the master device 100-2 may include a history index in the history information request signal and transfer the resulting history information request signal to the one or more home appliances 500-1 to 500-4. Here, the history index may be information indicative of whether history information requested by the user is latest information.

Moreover, the controller 160 of the master device 100-2 may receive a control command from the user or second portable device 100-1 and transfer the received control command to the one or more home appliances 500-1 to 500-4.

In addition, the controller 160 of the master device 100-2 may receive history information or a control command response signal from each of the one or more home appliances 500-1 to 500-4 and transmit the received history information or control command response signal to the user or second portable device 100-1.

Figure 4:
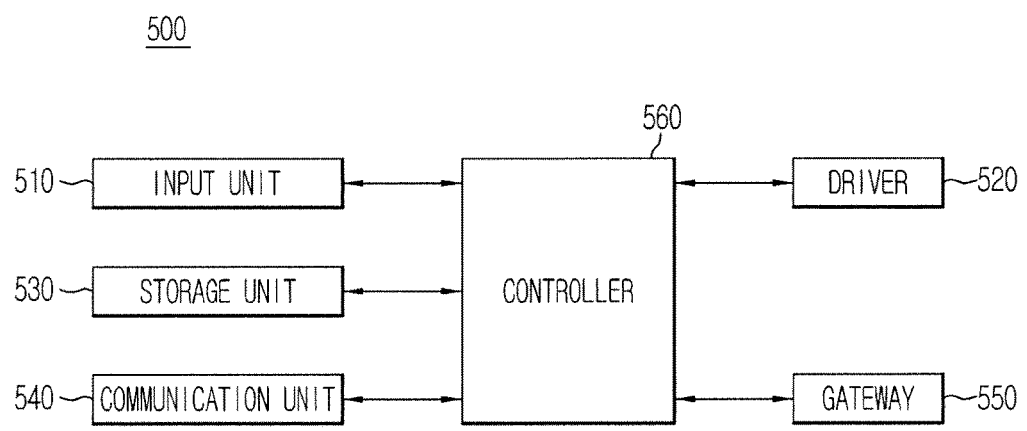
FIG. 4 is a block diagram showing the configuration of a home appliance equipped with a gateway according to an embodiment.

FIG. 4 is a block diagram showing the configuration of a home appliance equipped with a gateway according to an embodiment.

Referring to FIG. 4, each home appliance 500 may include an input unit 510, a driver 520, a storage unit 530, a communication unit 540, a gateway 550, and a controller 560.

The input unit 510 enables the user to input information.

The input unit 510 may include all the functions (operations) of the input unit 110 of the portable device 100, and receive the home appliance control command from the user.

The driver 520 may operate the home appliance 500 under control of the controller 560.

The storage unit 530 may store a plurality of programs and data necessary for the operation of the home appliance 500.

The storage unit 530 may also store synchronized data, generated by the controller 560 in response to the synchronization message transferred from the master device 100-2.

For example, the synchronized data may include history information (the amount of electricity used and a home appliance control history) of the home appliance 500.

The storage unit 530 may also store IP address information of the portable devices 100-2 to 100-5 and home appliances 500-1 to 500-4.

The communication unit 540 may transmit/receive data to/from the one or more first portable devices 100-2 to 100-5 or the other home appliances connected to the home network.

For example, the communication unit 540 may include a Wi-Fi modem.

The gateway 550 may interconnect the home network and the external communication network 200. The gateway 550 may include all the above-described functions (operations) of the gateway 150 of the portable device 100, with the exception that it operates when there is no portable device in the home.

The controller 560 may perform a control operation based on usage of a corresponding one of the home appliances 500-1 to 500-4 and control other components of the corresponding home appliance.

The controller 560 may also connect the corresponding home appliance to the home network.

When there is no portable device in the home, the controller 560 may select the corresponding home appliance as the master device. That is, the controller 560 may determine whether the gateway 550 has been activated, based on device information of the one or more home appliances 500-1 to 500-4 connected to the home network. Here, the device information may include IP address information of a corresponding one of the one or more home appliances 500-1 to 500-4 connected to the home network.

When the gateway 550 is activated, the controller 560 may receive a control command for the one or more home appliances 500-1 to 500-4 from the user and transfer the received control command to the one or more home appliances 500-1 to 500-4.

A brief description will be given of a method of selecting the corresponding one of the home appliances 500-1 to 500-4 connected to the home network as the master device by the controller 560.

The controller 560 searches for the home appliances 500-1 to 500-4 connected to the home network. Then, the controller 560 transmits IP address information of the corresponding home appliance to the other home appliances connected to the home network and receives IP address information of the other home appliances from the other home appliances.

The controller 560 stores the IP address information of the corresponding home appliance and the IP address information of the other home appliances connected to the home network in the storage unit 530. Then, the controller 560 compares the stored IP address information with one another, and selects the corresponding home appliance as the master device if the IP address information of the corresponding home appliance is lowest.

Selecting the master device is not limited to the above method, and may be performed by any other method.

When a new portable device is additionally connected to the home network, the controller 560 may deactivate the gateway 550 of the corresponding home appliance such that the new portable device is selected as the master device.

When the gateway 550 of the master device is activated, the controller 560 of the master device may perform a control operation to transfer the synchronization message for the data synchronization with the one or more home appliances 500-1 to 500-4 or the check alive message to the one or more home appliances 500-1 to 500-4.

A description will be given of a general function of the controller 560 of each of the one or more home appliances 500-1 to 500-4.

The controller 560 may synchronize history information of a corresponding one of the home appliances 500-1 to 500-4 with a latest version in linkage with the master device 100-2, etc.

Upon receiving the synchronization message from the master device 100-2 through the communication unit 540, the controller 560 may generate latest history information in linkage with the external server 300 and store the generated latest history information in the storage unit 530. For the generation of the latest history information, the controller 560 may be provided with information stored in the external server 300 by transmitting/receiving data to/from the external server 300 through the master device 100-2. Then, the controller 560 may transfer the generated latest history information to the master device 100-2 whose gateway is activated.

For example, the history information may include the amount of electricity used and a product control history of the corresponding home appliance.

In addition, upon receiving the history information request signal from the user through the second portable device 100-1, the controller 560 may transmit the latest history information to the second portable device 100-1.

For example, the controller 560 may determine whether a history index included in the history information request signal is up-to-date information. If the history index is determined to be up-to-date information, the controller 560 may transfer the latest history information corresponding to the history index to the master device 100-2 whose gateway is activated.

In the case where the history index is determined not to be up-to-date information, the controller 560 may generate synchronized data including the latest history information through the above-stated data synchronization process and store the generated synchronized data in the storage unit 530 of the corresponding home appliance.

Then, the controller 560 may transfer the latest history information to the master device 100-2 whose gateway is activated.

Moreover, the controller 560 may receive a control command from the user or master device, and control the driver 520 in response to the control command to perform a control operation.

After performing the control operation, the controller 560 may transfer, to the user or master device, a control command response message including information about whether the control operation has been completed.

In addition, the controller 560 of each home appliance may include all the above-described functions of the controller 160 of each portable device.

Figure 5A:
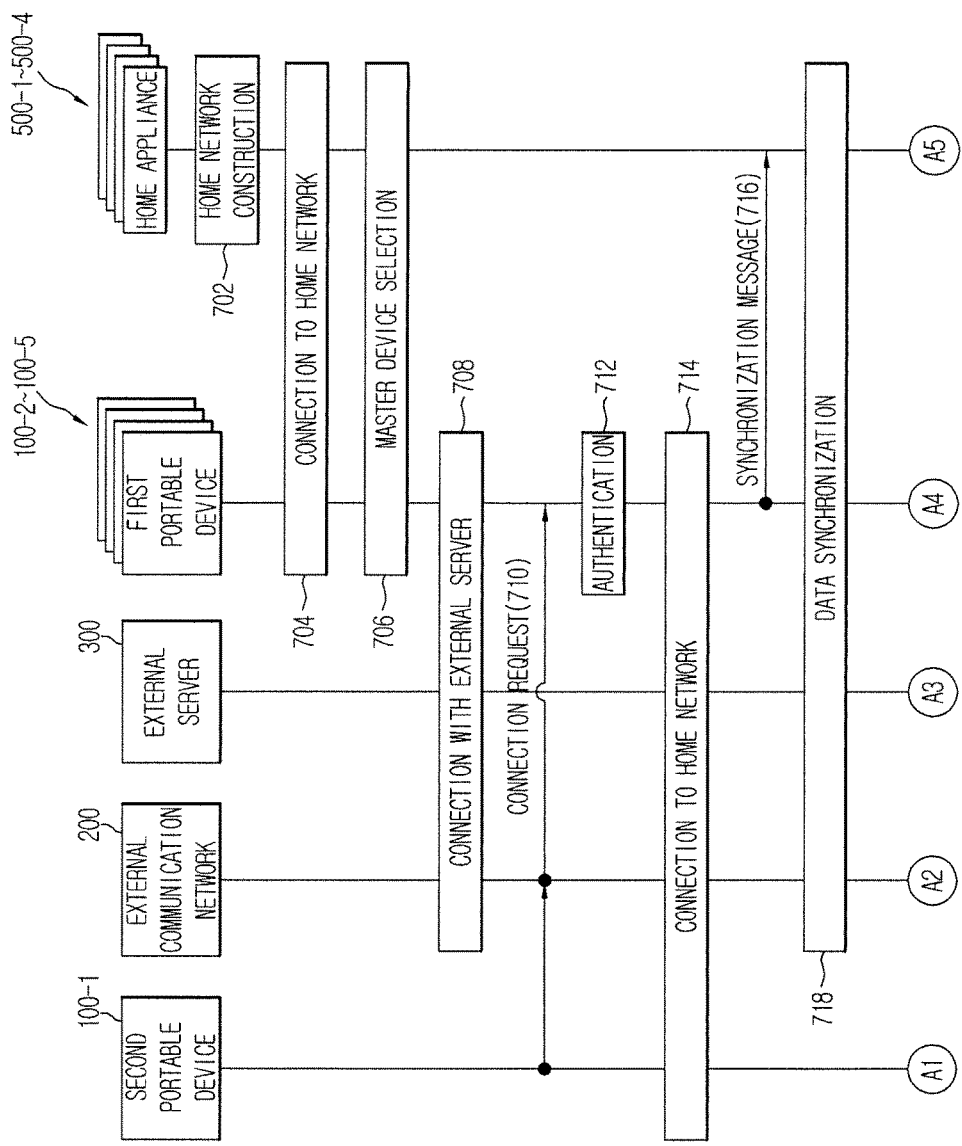
FIG. 5A and FIG. 5B are a flowchart illustrating a method of controlling a home appliance in the smart home system using the gateway-equipped portable device in the case where the user is away from home, according to an embodiment.
Figure 5B:
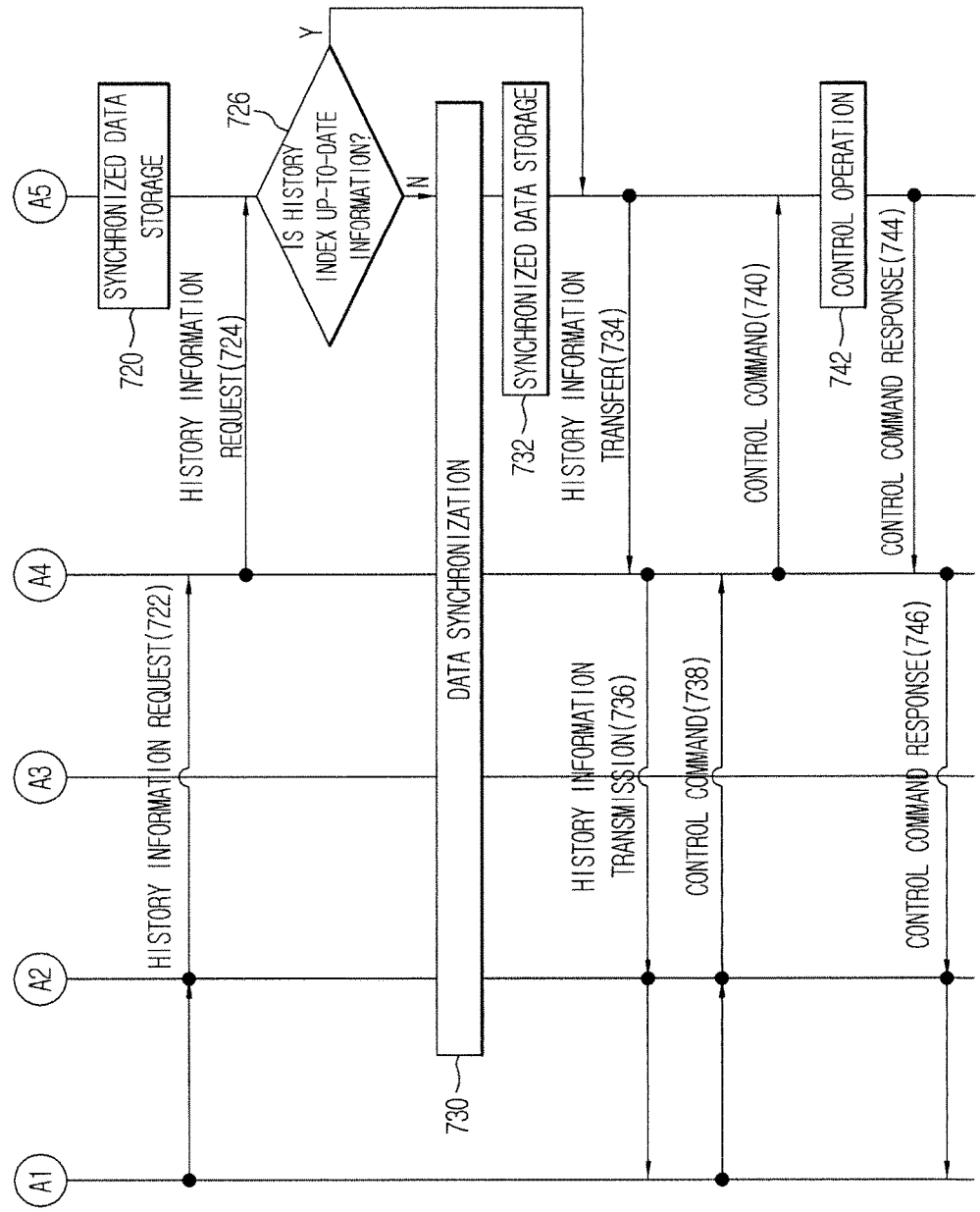

FIG. 5A and FIG. 5B are a flowchart illustrating a method of controlling a home appliance in the smart home system using the gateway-equipped portable device in the case where the user is away from home, according to an embodiment.

FIG. 5A and FIG. 5B are illustrates a process of controlling the one or more home appliances 500-1 to 500-4 in the smart home system using the one or more gateway-equipped first portable devices 100-2 to 100-5 in the case where the second portable device 100-1 of the user, the external communication network 200 and the external server 300 are located outside the home and the one or more first portable devices 100-2 to 100-5 and the one or more home appliances 500-1 to 500-4 are located in the home, as shown in FIG. 2.

First, the one or more home appliances 500-1 to 500-4 in the home are searched for to construct a home network (702).

Then, the one or more first portable devices 100-2 to 100-5 in the home are connected to the home network (704).

One first portable device or home appliance among the one or more first portable devices 100-2 to 100-5 or home appliances 500-1 to 500-4 connected to the home network in the home is selected as a master device (706).

As stated previously with reference to FIG. 3, in the case where the first portable devices 100-2 to 100-5 and the home appliances 500-1 to 500-4 are both present in the home, a first portable device having lowest IP address information among the first portable devices 100-2 to 100-5 may be selected as the master device.

The following description will be given on the assumption that the first portable device 100-2 is selected as the master device.

When the first portable device 100-2 is selected as the master device, the gateway of the master device 100-2 is activated, and the home network is connected with the external communication network 200 and the external server 300 through the master device 100-2 (708).

When the user sends a connection request signal using the second portable device 100-1, the connection request signal is transferred to the master device 100-2 in the home through the external communication network 200 (710).

Upon receiving the connection request signal from the second portable device 100-1 through the external communication network 200, the master device 100-2 performs an authentication process based on user authentication information (712).

Then, the master device 100-2 connects the second portable device 100-1 to the home network through the external communication network 200 (714).

The master device 100-2 transfers a synchronization message to the home appliances 500-1 to 500-4 when the second portable device 100-1 is connected to the home network, when the master device 100-2 is connected to the home network for the first time, when a change occurs in the portable devices 100-2 to 100-5 and home appliances 500-1 to 500-4 connected to the home network, or at an interval of a predetermined period (716).

Upon receiving the synchronization message, each of the home appliances 500-1 to 500-4 synchronizes various data with a latest version in linkage with the external server 300 through the master device 100-2 (718).

Then, each of the home appliances 500-1 to 500-4 stores the synchronized data and transfers the synchronized data to the master device 100-2 (720).

Next, when the user requests history information through the second portable device 100-1, the master device 100-2 receives a history information request signal through the external communication network 200 and transfers the received history information request signal to a corresponding one of the home appliances 500-1 to 500-4 (722 and 724).

Upon receiving the history information request signal, the corresponding home appliance determines whether a history index in the history information request signal is up-to-date information (726). If the history index is determined to be up-to-date information, the corresponding home appliance transmits history information corresponding to the history index to the second portable device 100-1 through the master device 100-2 (734 and 736).

If the history index is determined not to be up-to-date information, the corresponding home appliance performs a data synchronization process, stores synchronized data and then transmits latest history information to the second portable device 100-1 through the master device 100-2 (730, 732, 734 and 736).

In the case where the user inputs a home appliance control command through the second portable device 100-1, the control command is transmitted to a corresponding one of the home appliances 500-1 to 500-4 through the external communication network 200 and the master device 100-2 (738 and 740).

Upon receiving the control command, the corresponding home appliance performs a control operation corresponding to the control command and sends back, to the second portable device 100-1, a control command response signal including information about whether the control operation has been completed (742, 744 and 746).

In addition, the control method of the smart home system according to an embodiment may perform all the functions described previously with reference to FIGS. 2 to 4.

Figure 6:
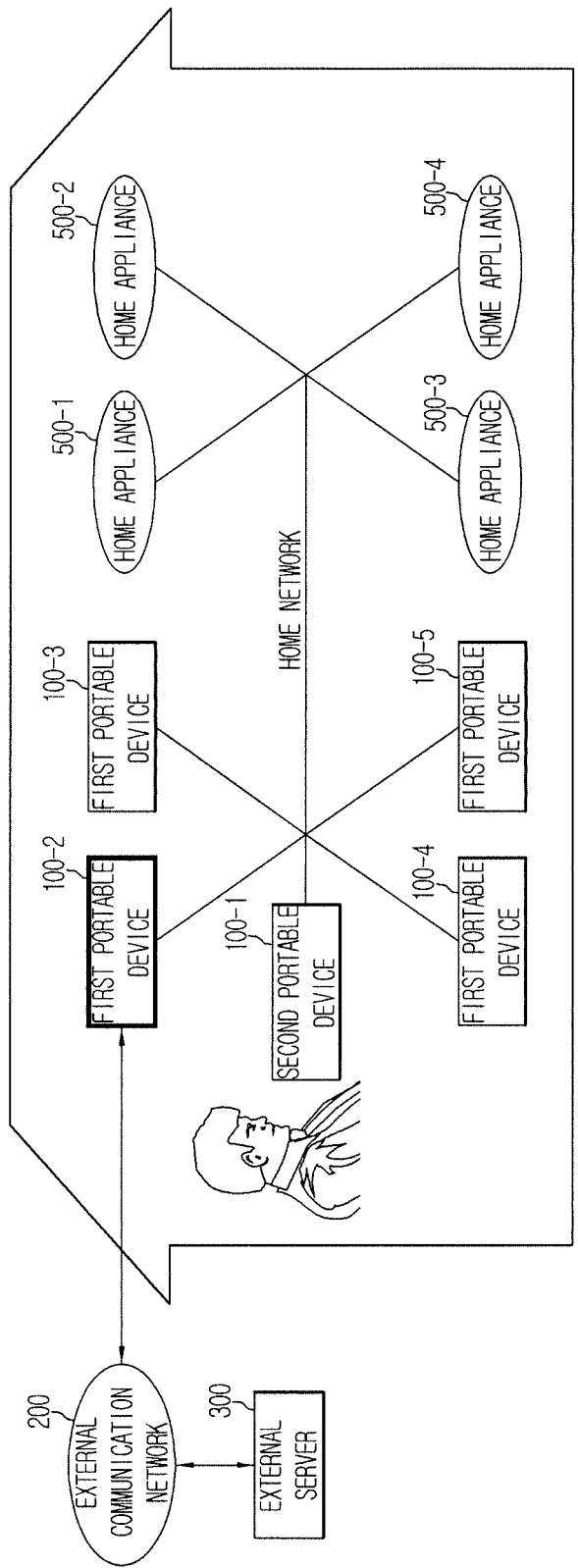
FIG. 6 is a conceptual diagram of a smart home system using a portable device equipped with a gateway in the case where the user is at home, according to an embodiment.

FIG. 6 is a conceptual diagram of a smart home system using a portable device equipped with a gateway in the case where the user is at home, according to an embodiment.

Referring to FIG. 6, the smart home system according to an embodiment may include one or more first portable devices 100-2 to 100-5, a second portable device 100-1 and one or more home appliances 500-1 to 500-4 located in a home, and an external communication network 200 and an external server 300 located outside the home.

The second portable device 100-1 of FIG. 6 is different from the second portable device 100-1 of FIG. 2 in that it is located in the home.

For example, the second portable device 100-1 of FIG. 6 may be the second portable device 100-1 of FIG. 2 carried by the user after having returned home.

The external communication network 200, external server 300, portable devices 100-1 to 100-5 and home appliances 500-1 to 500-4 shown in FIG. 6 may include all the functions stated previously with reference to FIGS. 2 to 4.

Exceptionally, because the second portable device 100-1 of the user is located in the home, the smart home system according to an embodiment may perform a different operation from that of an embodiment, which will be described.

First, a master device is selected from among one or more portable devices present in the home.

In the case where the portable devices 100-1 to 100-5 and the home appliances 500-1 to 500-4 are both present in the home, one of the portable devices 100-1 to 100-5 is selected as the master device.

As a result, each of the portable devices 100-1 to 100-5 transfers IP address information thereof to the other portable devices, and receives and stores IP address information of the other portable devices from the other portable devices.

Then, a portable device having lowest IP address information among the IP address information of all the portable devices 100-1 to 100-5 in the home is selected as the master device.

In the case where the second portable device 100-1 of the user is located in the home, it may also be selected as the master device, as will be described later with reference to FIG. 8.

For example, in FIG. 6, the first portable device 100-2 is assumed to be selected as the master device.

When the first portable device 100-2 is selected as the master device, the first portable device 100-2 activates the gateway thereof and the other portable devices deactivate the gateways thereof.

Therefore, the first portable device 100-2 may perform the same function as that of a conventional gateway fixed in the home.

Provided that the first portable device 100-2 is selected as the master device, the second portable device 100-1 of the user may directly transmit/receive data to/from the master device 100-2 over a home network.

Figure 7A:
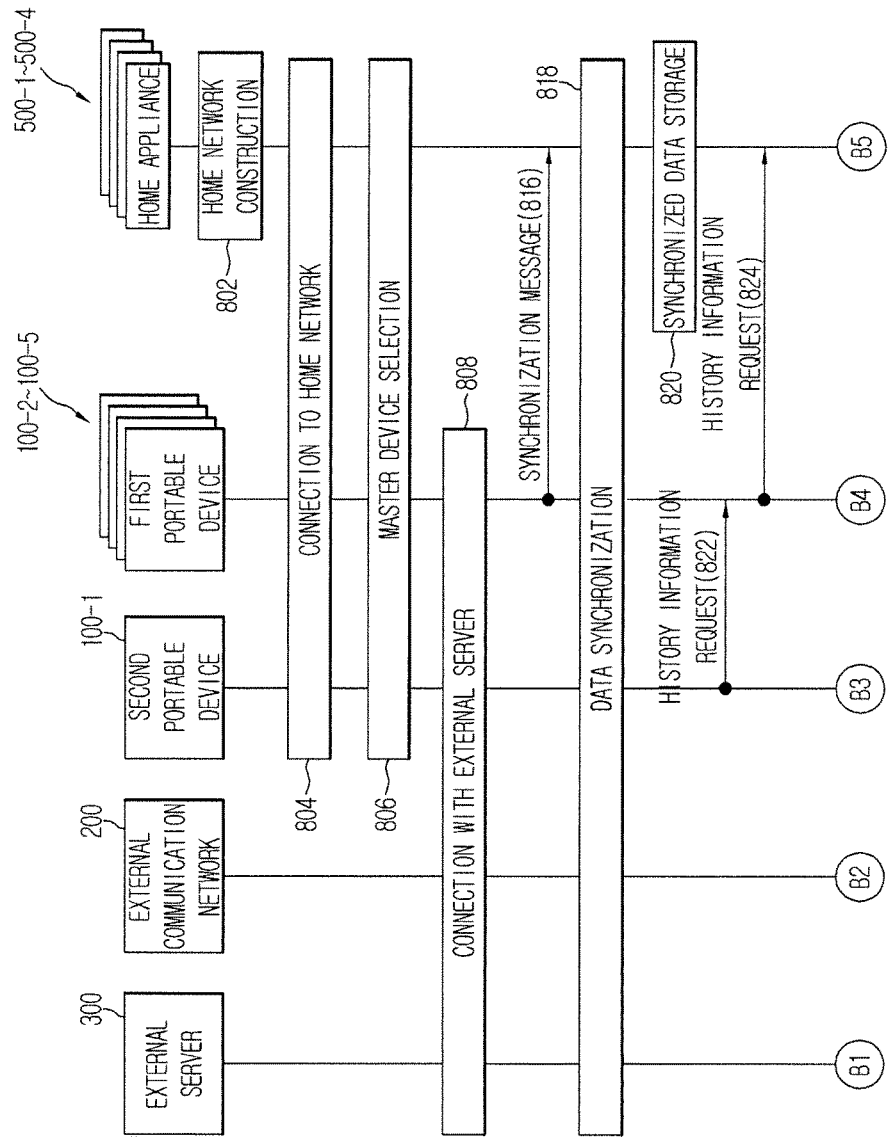
FIG. 7A and FIG. 7B are a flowchart illustrating a method of controlling a home appliance in the smart home system using the gateway-equipped portable device in the case where the user is at home, according to an embodiment.
Figure 7B:
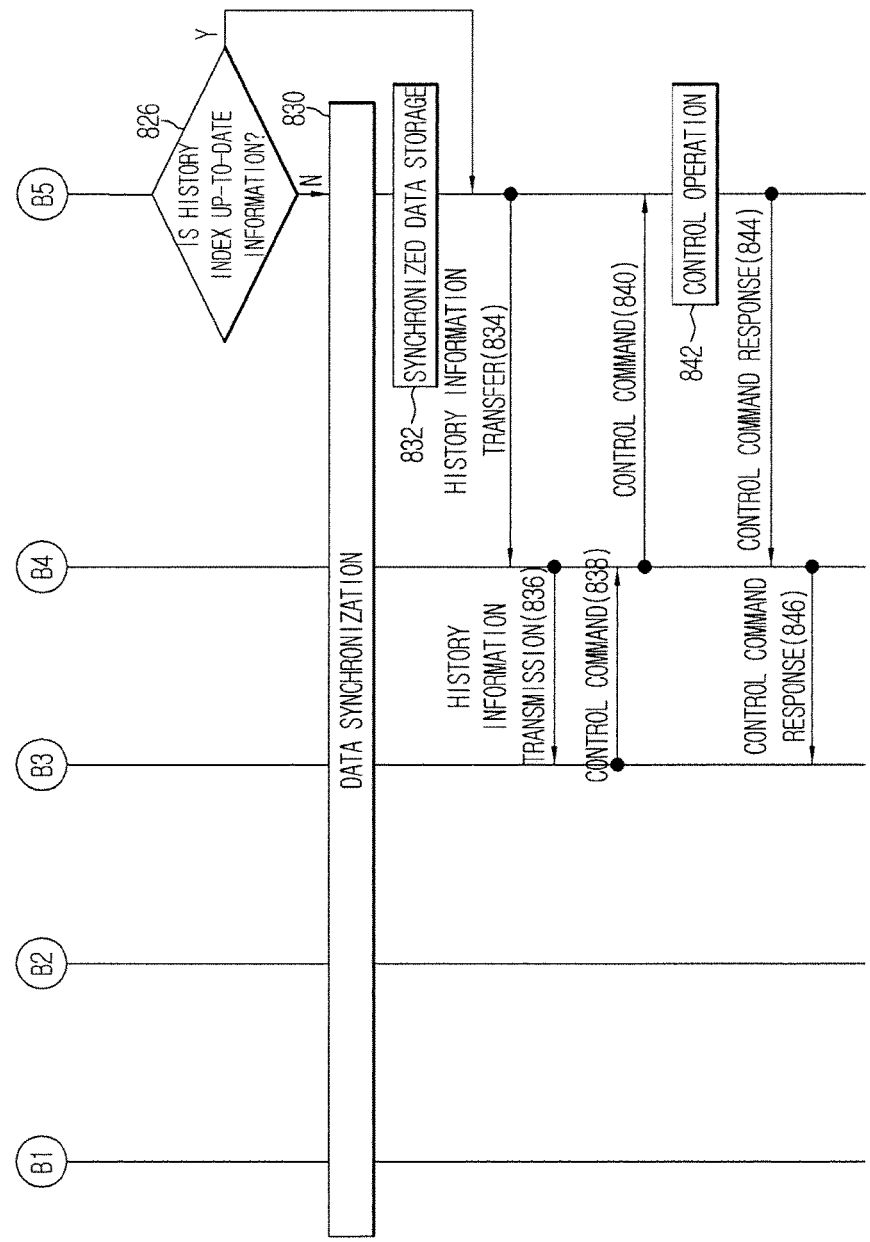

FIG. 7A and FIG. 7B are a flowchart illustrating a method of controlling a home appliance in the smart home system using the gateway-equipped portable device in the case where the user is at home, according to an embodiment.

FIG. 7A and FIG. 7B are illustrates a process of controlling the one or more home appliances 500-1 to 500-4 in the smart home system using the one or more gateway-equipped portable devices 100-1 to 100-5 in the case where the external communication network 200 and the external server 300 are present outside the home and the one or more portable devices 100-1 to 100-5 including the second portable device 100-1 of the user and the one or more home appliances 500-1 to 500-4 are present in the home, as shown in FIG. 6.

The flowchart of FIG. 7A and FIG. 7B are different from the flowchart of FIG. 5A and FIG. 5B in that the second portable device 100-1 of the user is located in the home.

In this regard, a portable device having lowest IP address information among all the portable devices 100-1 to 100-5 in the home including the second portable device 100-1 of the user is selected as a master device.

In FIG. 7A and FIG. 7B, the first portable device 100-2 is assumed to be selected as the master device.

Because the second portable device 100-1 of the user is located in the home and connected to the home network, it may directly transmit/receive data to/from the master device 100-2 over the home network.

Other operations are the same as those in FIG. 5A and FIG. 5B and a description thereof will thus be omitted.

Figure 8:
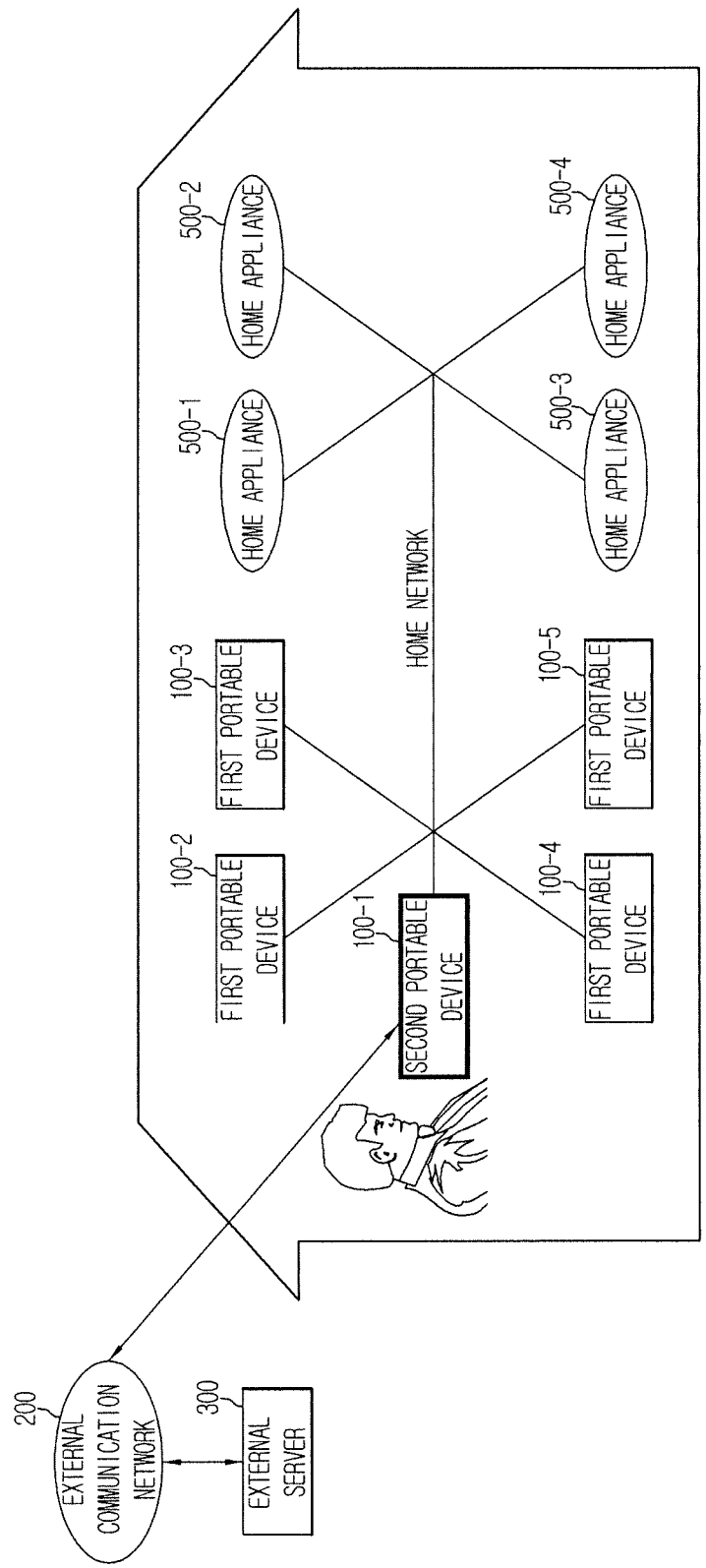
FIG. 8 is a conceptual diagram of a smart home system in which a portable device of the user is selected as a master device in the case where the user is at home, according to an embodiment.

FIG. 8 is a conceptual diagram of a smart home system in which a portable device of the user is selected as a master device in the case where the user is at home, according to an embodiment.

A second portable device 100-1 of FIG. 8 is different from the second portable device 100-1 of FIG. 6 in that it is selected as the master device.

For example, provided that the second portable device 100-1 of the user among portable devices 100-1 to 100-5 connected to a home network has lowest IP address information, the second portable device 100-1 may be selected as the master device.

Referring to FIG. 8, the smart home system according to an present embodiment may include one or more first portable devices 100-2 to 100-5 and one or more home appliances 500-1 to 500-4 located in a home, and the home network to interconnect the one or more first portable devices 100-2 to 100-5 and the one or more home appliances 500-1 to 500-4.

The second portable device 100-1 of the user may further be provided in the smart home system according to an embodiment. The second portable device 100-1 is equipped with a gateway and connected to the home network in the home. The second portable device 100-1 activates the gateway to connect the home network with an external communication network 200 and transfer a control command for the one or more home appliances 500-1 to 500-4 input from the user to the one or more home appliances 500-1 to 500-4.

Therefore, the second portable device 100-1 of the user functions as the master device and interconnects the external communication network 200 and the home network. As a result, the user may control the home appliances 500-1 to 500-4 in the home through the second portable device 100-1.

The external communication network 200, external server 300, portable devices 100-1 to 100-5 and home appliances 500-1 to 500-4 shown in FIG. 8 may include all the functions stated previously with reference to FIGS. 2 to 4.

Figure 9A:
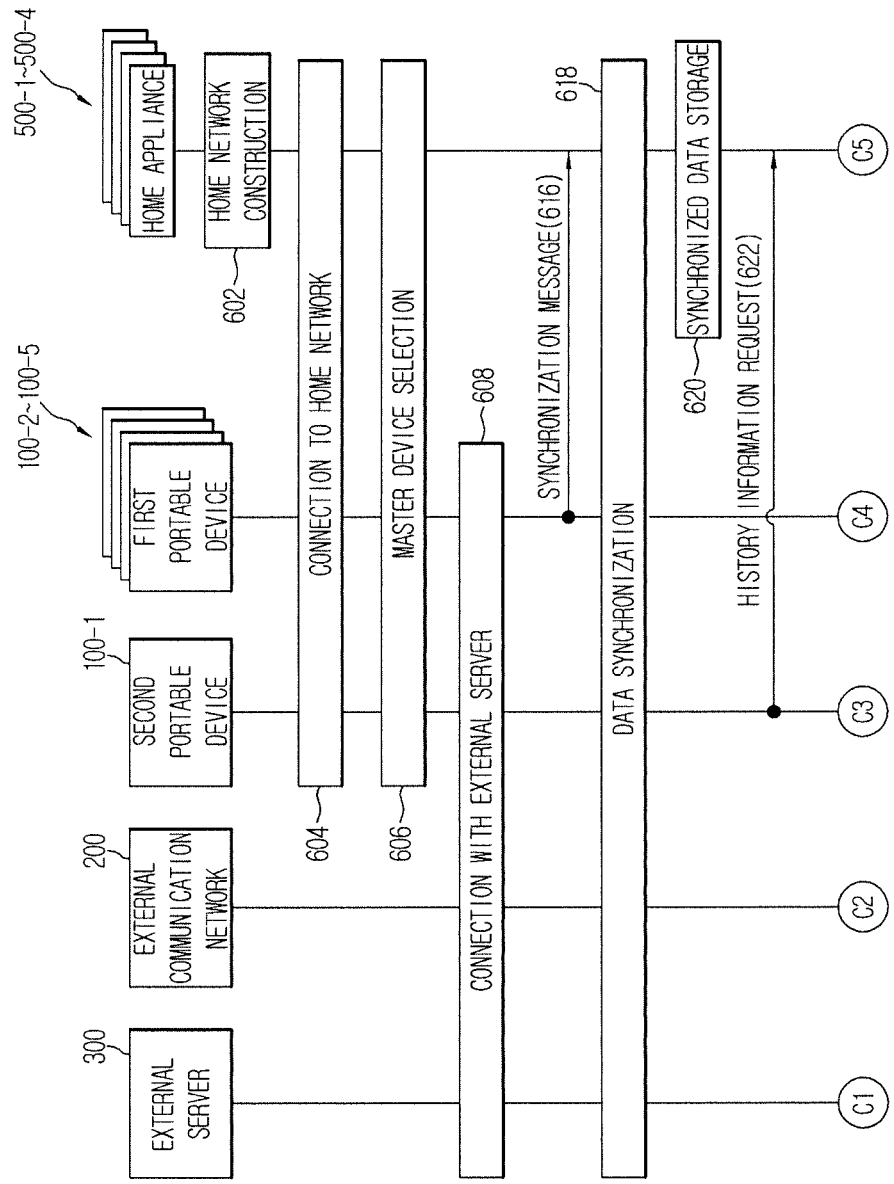
FIG. 9A and FIG. 9B are a flowchart illustrating a method of controlling a home appliance in the smart home system in which the portable device of the user is selected as the master device in the case where the user is at home, according to an embodiment.
Figure 9B:
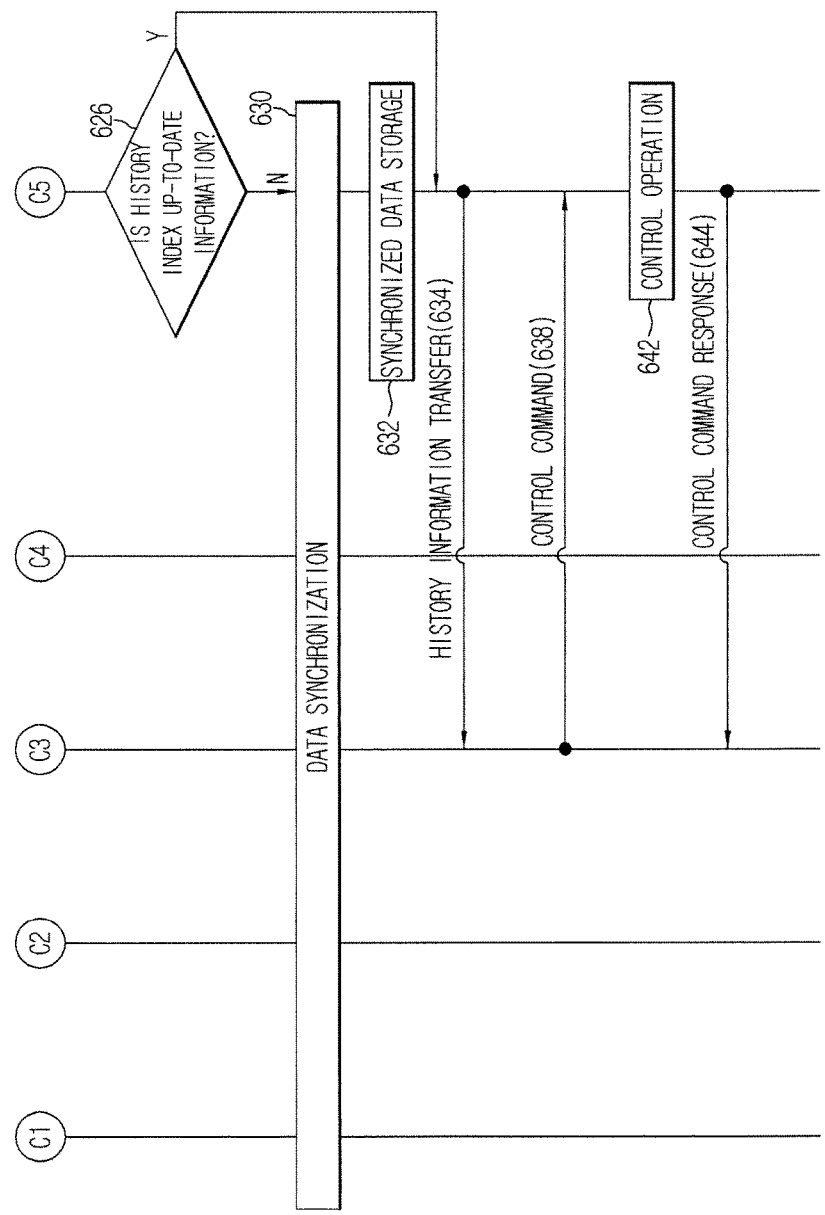

FIG. 9A and FIG. 9B are a flowchart illustrating a method of controlling a home appliance in the smart home system in which the portable device of the user is selected as the master device in the case where the user is at home, according to an embodiment.

According to an embodiment, in the control method of the smart home system which includes the one or more first portable devices 100-2 to 100-5 and the one or more home appliances 500-1 to 500-4 located in the home, and the second portable device 100-1 which is equipped with the gateway and located in the home and receives the control command for the one or more home appliances 500-1 to 500-4 from the user, the one or more home appliances 500-1 to 500-4 in the home are searched for to construct the home network, and the second portable device 100-1 and the one or more first portable devices 100-2 to 100-5 in the home are connected to the home network.

Then, the second portable device 100-1 is selected as the master device based on device information of the second portable device 100-1 and one or more first portable devices 100-2 to 100-5 connected to the home network.

Thereafter, the gateway of the master device 100-1 is activated, the home network is connected with the external communication network 200 through the master device 100-1, and the control command for the one or more home appliances 500-1 to 500-4 input from the user is transferred to the one or more home appliances 500-1 to 500-4 through the master device 100-1.

An embodiment is characterized in that the second portable device 100-1 of the user is selected as the master device when the user is present in the home. Other operations of FIG. 9A and FIG. 9B are the same as those of FIG. 7A and FIG. 7B and a description thereof will thus be omitted.

That is, the second portable device 100-1 of the user is selected as the master device, so as to interconnect the external communication network 200 and the home network.

Figure 10:
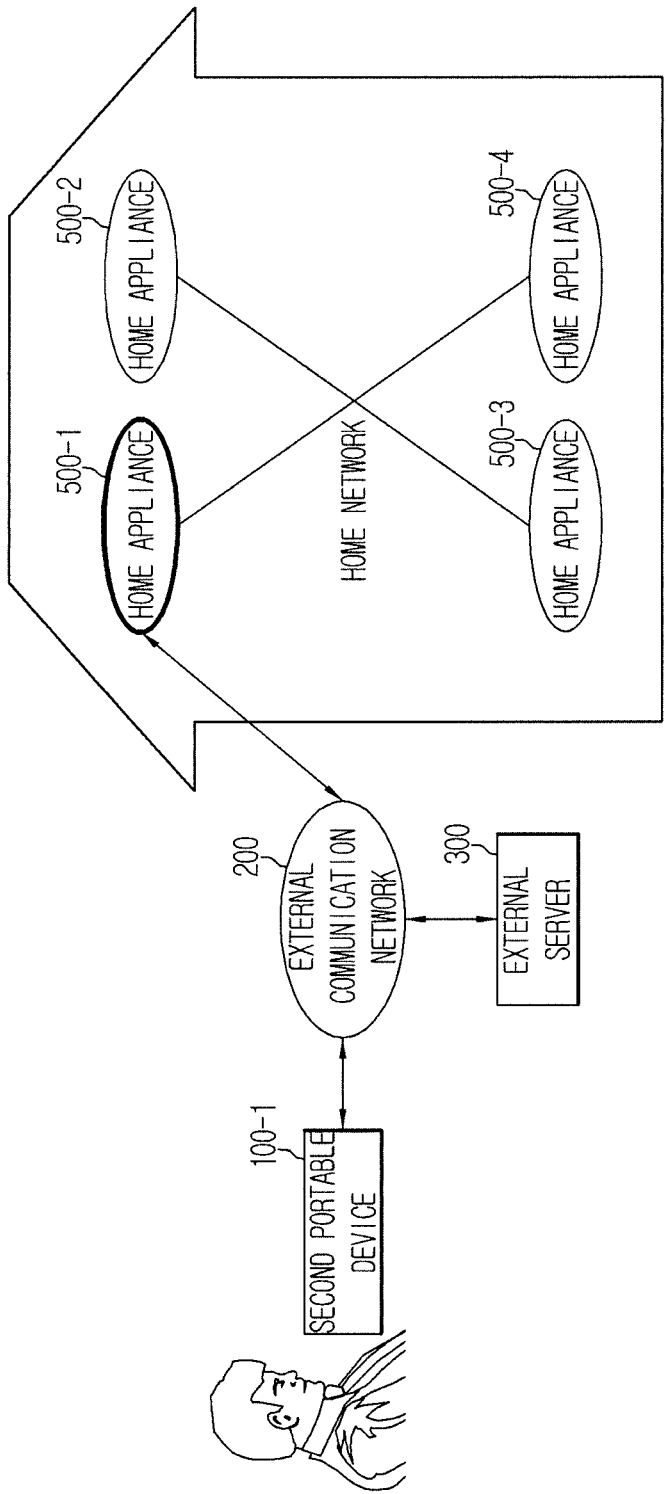
FIG. 10 is a conceptual diagram of a smart home system using a home appliance equipped with a gateway in the case where the user is away from home, according to an embodiment.

FIG. 10 is a conceptual diagram of a smart home system using a home appliance equipped with a gateway in the case where the user is away from home, according to an embodiment.

Referring to FIG. 10, the smart home system according to an embodiment may include a second portable device 100-1 of the user, an external communication network 200 and an external server 300 located outside the home, and one or more home appliances 500-1 to 500-4 located in the home.

For example, there may be no portable device in the home because all portable devices located in the home were moved out of the home.

Although only the second portable device 100-1 of the user is shown in FIG. 10 as being located outside the home, embodiments are not limited thereto. For example, one or more portable devices including the second portable device 100-1 may be located outside the home and connected with a master device located in the home to transmit/receive data to/from the master device.

The external communication network 200, external server 300, portable device 100-1 and home appliances 500-1 to 500-4 shown in FIG. 10 may include all the functions stated previously with reference to FIGS. 2 to 4.

Exceptionally, because only the one or more home appliances 500-1 to 500-4 are located in the home, the smart home system according to an embodiment may perform a different operation from that of one or more of the above embodiments, which will be described.

First, the master device is selected from among the one or more home appliances 500-1 to 500-4 present in the home.

For example, each of the home appliances 500-1 to 500-4 may transfer IP address information thereof to the other home appliances, and receive and store IP address information of the other home appliances from the other home appliances.

Then, a home appliance having lowest IP address information among the IP address information of all the home appliances 500-1 to 500-4 in the home may be selected as the master device.

In FIG. 10, the home appliance 500-1 is assumed to be selected as the master device.

When the home appliance 500-1 is selected as the master device, the home appliance 500-1 activates the gateway thereof and the other home appliances deactivate the gateways thereof.

Therefore, the home appliance 500-1 may perform the same function as that of a conventional gateway fixed in the home.

Provided that the home appliance 500-1 is selected as the master device, the second portable device 100-1 of the user may transmit/receive data to/from the master device 500-1 over the external communication network 200.

Figure 11A:
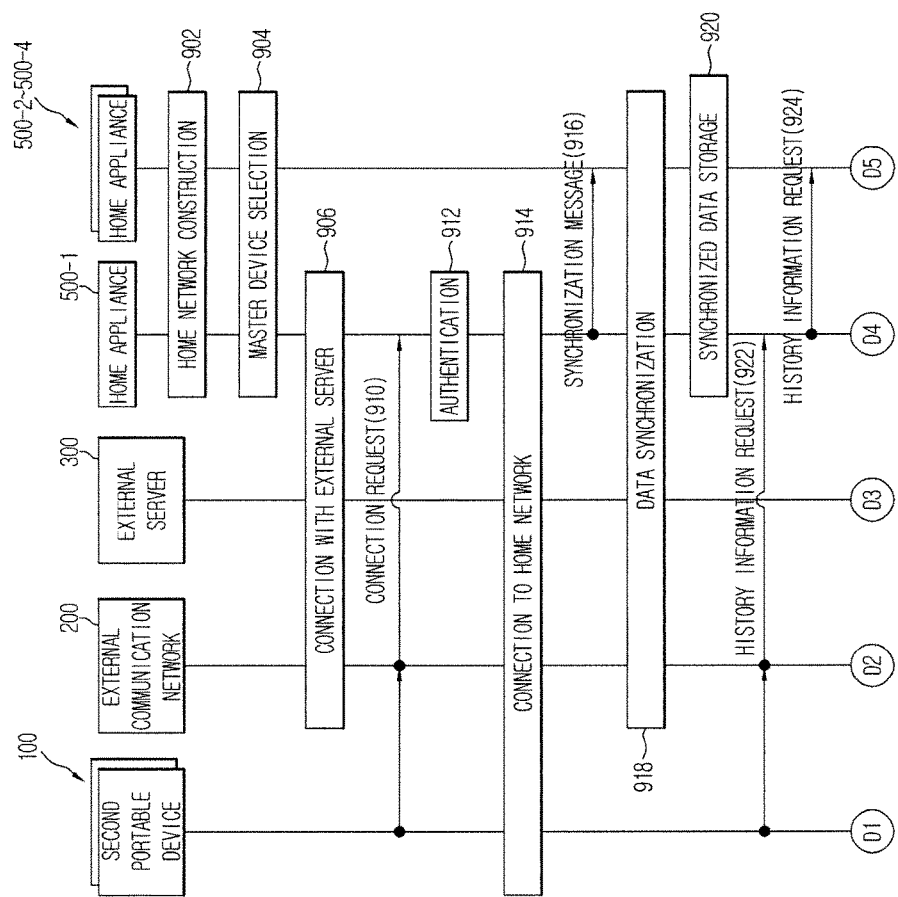
FIG. 11A and FIG. 11B are a flowchart illustrating a method of controlling a home appliance in the smart home system using the gateway-equipped home appliance in the case where the user is away from home, according to an embodiment.
Figure 11B:
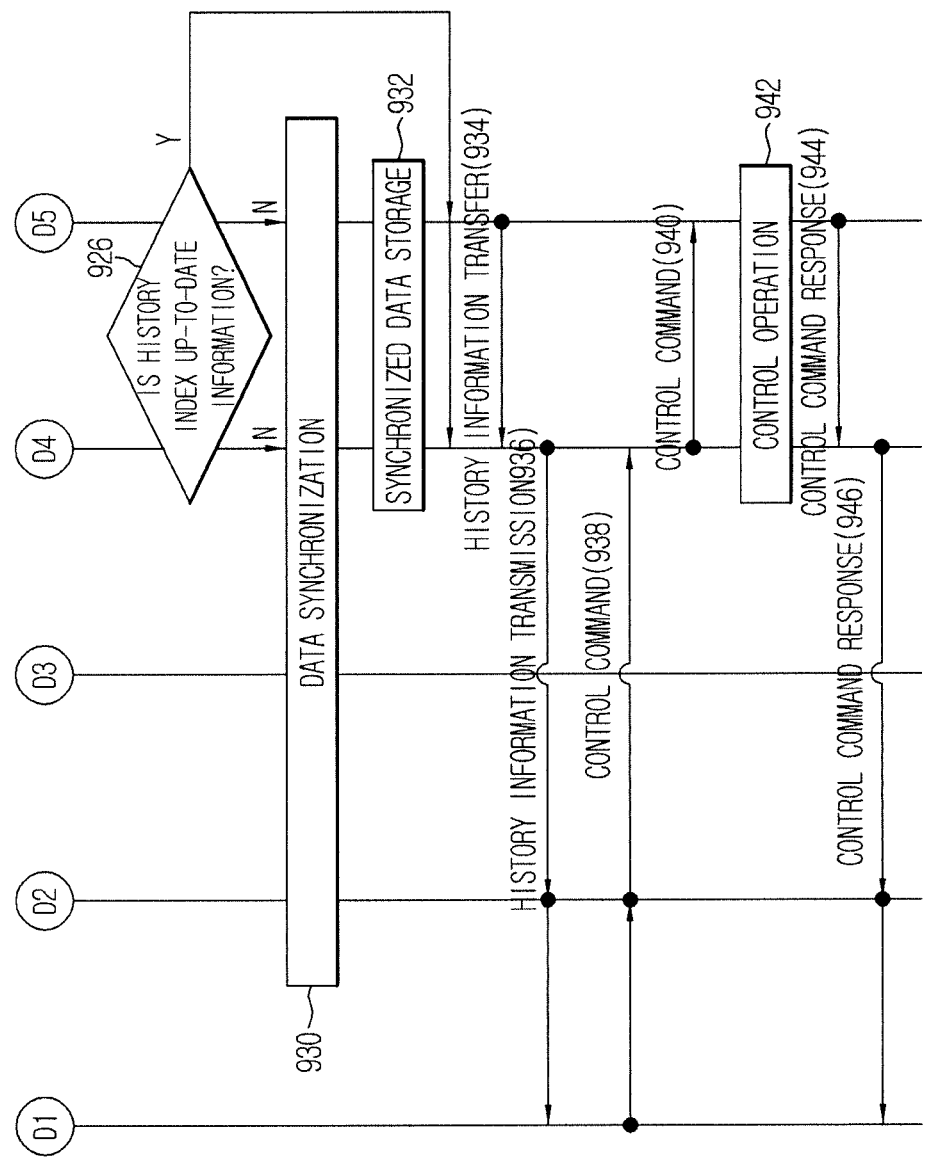

FIG. 11A and FIG. 11B are a flowchart illustrating a method of controlling a home appliance in the smart home system using the gateway-equipped home appliance in the case where the user is away from home, according to an embodiment.

FIG. 11A and FIG. 11B are illustrates a process of controlling the one or more home appliances 500-1 to 500-4 in the smart home system using the gateway-equipped home appliance in the case where the second portable device 100-1 of the user, the external communication network 200 and the external server 300 are present outside the home and the one or more home appliances 500-1 to 500-4 are present in the home, as shown in FIG. 10.

First, the one or more home appliances 500-1 to 500-4 in the home construct a home network (902).

The flowchart of FIG. 11A and FIG. 11B are different from the flowchart of FIG. 5A and FIG. 5B in that there is no portable device in the home. In this regard, a home appliance having lowest IP address information among all the home appliances 500-1 to 500-4 in the home is selected as a master device (904).

The following description will be given on the assumption that the home appliance 500-1 is selected as the master device.

The master device 500-1 connects the home network with the external server 300 through the external communication network 200 (906).

When the user sends a connection request signal using the second portable device 100-1, the connection request signal is transferred to the master device 500-1 in the home through the external communication network 200 (910).

Upon receiving the connection request signal from the second portable device 100-1, the master device 500-1 performs an authentication process based on user authentication information (912).

Then, the master device 500-1 connects the second portable device 100-1 to the home network through the external communication network 200 (914).

The master device 500-1 transfers a synchronization message to the home appliances 500-1 to 500-4 when a change occurs in the portable device 100-1 and home appliances 500-1 to 500-4 connected to the home network (916).

Upon receiving the synchronization message, each of the home appliances 500-1 to 500-4 synchronizes various data with a latest version in linkage with the external server 300 through the master device 500-1 (918).

Then, each of the home appliances 500-1 to 500-4 stores the synchronized data and transfers the synchronized data to the master device 500-1 (920).

When the user requests history information through the second portable device 100-1, the master device 500-1 receives a history information request signal through the external communication network 200 and transfers the received history information request signal to a corresponding one of the home appliances 500-1 to 500-4 (922 and 924).

Upon receiving the history information request signal, the corresponding home appliance determines whether a history index in the history information request signal is up-to-date information (926). If the history index is determined to be up-to-date information, the corresponding home appliance transmits history information corresponding to the history index to the second portable device 100-1 through the master device 500-1 (934 and 936).

If the history index is determined not to be up-to-date information, the corresponding home appliance performs a data synchronization process, stores synchronized data and then transmits latest history information to the second portable device 100-1 through the master device 500-1 (930, 932, 934 and 936).

In the case where the user inputs a home appliance control command through the second portable device 100-1, the control command is transmitted to a corresponding one of the home appliances 500-1 to 500-4 through the external communication network 200 and the master device 500-1 (938 and 940).

Upon receiving the control command, the corresponding home appliance performs a control operation corresponding to the control command and sends back, to the second portable device 100-1, a control command response signal including information about whether the control operation has been completed (942, 944 and 946).

As is apparent from the above description, according to an aspect of one or more embodiments, a gateway is installed in a portable device often used by the user, thereby eliminating the need to purchase a separate gateway and increasing user convenience.

Furthermore, the user may remotely perform state-monitoring and control of home appliances in a home using the portable device.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A home appliance, which is a device, comprising:
   a gateway;
   at least one memory storing instructions; and
   at least one processor that executes the instructions so that the home appliance:
   connects to a home network,
   while connected to the home network, communicates, through the home network, with another device that is connected to the home network and that includes a gateway, to determine whether the home appliance is to be a master device of the home appliance and the another device, based on device information of the home appliance and device information of the another device,
   activate the gateway of the home appliance in response to it being determined that the home appliance is to be the master device, so that the gateway of the home appliance thereby connects the home network with an external communication network, and
   while the gateway of the home appliance is activated and thereby connects the home network with the external communication network,
   causes the activated gateway to be operable to receive a control command for the another device from the external communication network, and transfer the received control command through the home network to the another device.

2. The home appliance according to claim 1, wherein the device information comprises Internet protocol (IP) address information.

3. The home appliance according to claim 1, wherein the another device is a home appliance.

4. A home appliance, which is a device, comprising:
   a gateway;
   at least one memory storing instructions; and
   at least one processor that executes the instructions so that the home appliance:
   connects to a home network,
   while connected to the home network, communicates, through the home network, with other devices, each equipped with a gateway, that are connected to the home network, to determine whether the home appliance is to be a master device of the home appliance and the other devices, based on device information of the home appliance and device information of the other devices,
   activates the gateway of the home appliance in response to it being determined that the home appliance is to be the master device, so that the gateway of the home appliance thereby connects the home network with an external communication network, and
   while the gateway of the home appliance is activated and thereby connects the home network with the external communication network,
   for each respective device of the other devices, causes the activated gateway to be operable to receive a control command for the respective device from the external communication network, and transfer the received control command through the home network to the respective device.

5. The home appliance according to claim 4, wherein the at least one processor periodically transfers a check alive message to the other devices connected to the home network in response to it being determined that the home appliance is to be the master device.

6. The home appliance according to claim 5, wherein the at least one processor deactivates the gateway of the home appliance in response to it being determined that one of the other devices connected to the home network is to be the master device, and when no check alive message is received by one of the other devices, activates the gateway of the home appliance.

7. The home appliance according to claim 4, wherein the at least one processor deactivates the gateway of the home appliance so that a portable device is to be the master device, in response to the portable device being connected to the home network.

8. The home appliance according to claim 4, wherein the device information comprises Internet protocol (IP) address information.

9. The home appliance according to claim 4, wherein the other devices include at least one home appliance.

10. A portable device comprising:
   a gateway;
   at least one memory storing instructions; and
   at least one processor that executes the instructions so that the portable device:
      connects to a home network,
      while connected to the home network, communicates, through the home network, with other devices, each equipped with a gateway, that are connected to the home network, to determine whether the portable device is to be a master device of the portable device and the other devices, based on device information of the portable device and device information of the other devices,
      activates the gateway of the portable device in response to it being determined that the portable device is to be the master device, so that the gateway of the portable device thereby connects the home network with an external communication network, and
      while the gateway of the portable device is activated and thereby connects the home network with the external communication network,
         for each respective device of the other devices, causes the activated gateway to be operable to receive a control command for the respective device from the external communication network, and transfer the received control command through the home network to the respective device;
      wherein the other devices include at least one home appliance.

11. The portable device according to claim 10, wherein the device information comprises Internet protocol (IP) address information.

12. The portable device according to claim 10, wherein the portable device is a mobile phone.

13. The portable device according to claim 10, wherein the at least one processor periodically transfers a check alive message to the other devices connected to the home network in response to it being determined that the portable device is to be the master device.

14. The portable device according to claim 13, wherein the at least one processor deactivates the gateway of the portable device in response to it being determined that one of the other devices connected to the home network is to be the master device, and when no check alive message is received by one of the other devices, activates the gateway of the portable device.

15. The portable device according to claim 10, wherein the at least one processor selects one of the portable device and another portable device connected to the home network as a new master device in response to the another portable device being connected to the home network.

16. The portable device according to claim 15, wherein the at least one processor selects the new master device based on the history information of the another portable device and history information of the portable device.

17. The portable device according to claim 15, wherein the at least one processor deactivates the gateway of the portable device in response to it being determined that the another portable device connected to the home network is to be the new master device.

18. The portable device according to claim 10, wherein the at least one processor activates the gateway of the portable device so that another portable device is to be the master device, in response to the another portable device being connected to the home network.

* * * * *